(12) United States Patent
Song et al.

(10) Patent No.: US 8,035,483 B2
(45) Date of Patent: Oct. 11, 2011

(54) OSCILLATOR TUNING SYSTEM AND OSCILLATOR TUNING METHOD

(75) Inventors: Il-jong Song, Yongin-si (KR); Young-hoon Min, Yongin-si (KR); Chol-su Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1277 days.

(21) Appl. No.: 11/651,576

(22) Filed: Jan. 10, 2007

(65) Prior Publication Data

US 2008/0055091 A1  Mar. 6, 2008

(30) Foreign Application Priority Data

Aug. 25, 2006  (KR) .................. 10-2006-0081266

(51) Int. Cl.
 *H04Q 5/22* (2006.01)
 *H04B 1/00* (2006.01)
 *H01Q 11/12* (2006.01)
 *H04W 24/00* (2009.01)

(52) U.S. Cl. ............. 340/10.1; 340/10.41; 340/10.31; 340/10.33; 340/10.34; 455/456.1; 455/456.3; 455/41.2; 455/118

(58) Field of Classification Search .............. 340/10.1, 340/10.41
See application file for complete search history.

(56) References Cited

U.S. PATENT DOCUMENTS

| | | | |
|---|---|---|---|
| 5,019,815 A * | 5/1991 | Lemelson et al. ............ 340/933 |
| 5,231,273 A | 7/1993 | Caswell et al. |
| 5,471,212 A | 11/1995 | Sharpe et al. |
| 5,563,576 A * | 10/1996 | Drori et al. .................... 340/455 |
| 6,307,517 B1 | 10/2001 | Lee |
| 6,463,039 B1 * | 10/2002 | Ricci et al. ..................... 370/277 |
| 6,906,615 B2 * | 6/2005 | Friedman ..................... 340/10.4 |
| 6,947,513 B2 * | 9/2005 | O'Toole et al. ............... 375/374 |
| 2003/0220711 A1 * | 11/2003 | Allen ............................ 700/215 |
| 2004/0139358 A1 | 7/2004 | Elbe et al. |
| 2005/0052279 A1 * | 3/2005 | Bridgelall .................... 340/10.1 |
| 2006/0244630 A1 * | 11/2006 | Finkenzeller ............ 340/870.07 |
| 2007/0194933 A1 * | 8/2007 | Shanks et al. .............. 340/572.7 |

FOREIGN PATENT DOCUMENTS

| | | |
|---|---|---|
| JP | 11-15934 A | 1/1999 |
| JP | 2004-274218 A | 9/2004 |
| JP | 2005-503605 A | 2/2005 |
| JP | 2006-134150 A | 5/2006 |
| KR | 20020081292 A | 10/2002 |

OTHER PUBLICATIONS

Office Action issued Jun. 15, 2010 in counterpart Japanese Application No. 2007-069795.

* cited by examiner

*Primary Examiner* — Daniel Wu
*Assistant Examiner* — Pameshanand Mahase
(74) *Attorney, Agent, or Firm* — Sughrue Mion, PLLC

(57) ABSTRACT

An oscillator tuning system and an oscillator tuning method are provided. The system includes a determination unit which determines whether a power which is used in an RFID tag having an RFID oscillator is greater than a reference value; and a frequency tuner which tunes a driving frequency of the RFID oscillator according to a result of the determination. The method includes determining whether a power which is used in an RFID tag having an RFID oscillator is greater than a reference value; and tuning a driving frequency of the RFID oscillator according to a result of the determination.

17 Claims, 4 Drawing Sheets

OSCILLATOR TUNING SYSTEM AND OSCILLATOR TUNING METHOD

CROSS-REFERENCE TO RELATED APPLICATION

This application claims priority from Korean Patent Application No. 10-2006-0081266, filed on Aug. 25, 2006, in the Korean Intellectual Property Office, the entire disclosure of which is incorporated herein by reference.

BACKGROUND OF THE INVENTION

1. Field of the Invention

Apparatuses and methods consistent with the present invention relate to an oscillator tuning system and an oscillator tuning method which enables a backscatter link frequency (BLF) of a radio frequency identification (RFID) oscillator to be within a range of a threshold by distinguishing where there is abundant energy, i.e. a near field region, from where there is less abundant energy, i.e. a far field region and operating the RFID oscillator at a driving frequency according to the distinguished regions.

2. Description of Related Art

An RFID tag is a type of a transponder device that can respond to being read by sending contents of its embedded memory by backscatter communication to an interrogator, i.e. a reader. A passive RFID tag has no bakery; instead, it gets all the needed energy to send a signal to the reader from a carrier signal of the reader.

When an oscillator within the RFID tag is operated using a driving frequency of 1.28 MHz, a backscatter link frequency of the oscillator according to 'PC Gen. 2 Spec.' is out of some part of the range of a threshold. Accordingly, power consumption may be reduced. However, it is not easy to stably process a signal of an oscillator within an RFID tag being operated using a driving frequency of 1.28 MHz.

In order to address the above problem, an oscillator operating method, which is performed by increasing the driving frequency, is provided. However, the method has a problem in that power consumption is so great that good performance may not be guaranteed when processing the signal of the RFID tag in a long distance environment, despite the fact a backscatter link frequency (BLF) of the RFID oscillator may be within a range of the threshold in all regions by operating the oscillator using a higher frequency of 1.92 MHz.

Therefore, a new tuning model for an RFID oscillator is needed which can adjustably process the signal of the RFID tag in all regions, and smoothly process the RFID tag in a long distance environment by adaptively tuning the driving frequency of the RFID oscillator.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an oscillator tuning system and an oscillator tuning method which enables a backscatter link frequency (BLF) of an RFID oscillator to be within a range of a threshold in all regions by adaptively tuning a driving frequency of the RFID oscillator depending upon a strength of a power used in an RFID tag.

The present invention also provides an oscillator tuning system and an oscillator tuning method which can process a signal of an RFID tag using lower power consumption in a long distance environment by generating a signal capable of being used to distinguish a far field region from a near field region according to a distance between the RFID tag and an RFID reader, and by tuning a driving frequency of an RFID oscillator using the generated signal.

According to an aspect of the present invention, there is provided an oscillator tuning system including a determination unit which determines whether a power which is used in an RFID tag having an RFID oscillator is greater than a reference value; and a frequency tuner which tunes a driving frequency of the RFID oscillator according to a result of the determination.

According to another aspect of the present invention, there is provided an oscillator tuning system including a determination unit which measures a distance from an RFID tag having an RFID oscillator to an RFID reader associated with the RFID tag, and determines whether the measured distance is greater than a reference value; and a frequency tuner which tunes a driving frequency of the RFID oscillator according to a result of the determination.

According to another aspect of the present invention, there is provided an oscillator tuning method including determining whether a power which is used in an RFID tag having an RFID oscillator is greater than a reference value; and tuning a driving frequency of the RFID oscillator according to a result of the determination.

According to another aspect of the present invention, there is provided an oscillator tuning method including measuring a distance from an RFID tag having an RFID oscillator to an RFID reader associated with the RFID tag; determining whether the measured distance is greater than a reference value; and tuning a driving frequency of the RFID oscillator according to a result of the determination.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS OF THE INVENTION

Reference will now be made in detail to certain exemplary embodiments of the present invention, examples of which are illustrated in the accompanying drawings, wherein like reference numerals refer to like elements throughout. The exemplary embodiments are described below in order to explain the present inventive concept by referring to the figures.

A passive RFID tag generates driving power for all circuits within the RFID tag by receiving energy when an RFID reader radiates an RF signal and converting this energy into a DC power, without the need for a power supply from a power supply unit. Therefore, the RFID tag is designed to operate using low power consumption.

Optimizing a current that flows into an RFID oscillator in the RFID tag is advantageous for operation of the RFID tag using lower power consumption. In this instance, power consumption according to the current may be approximated by, Power consumption=$\alpha * C * VDD^2 * f$ where '$\alpha$' denotes switching activity, 'C' denotes an amount of a capacitance of a logic device, 'VDD' denotes a voltage, and 'f' denotes a driving frequency of an oscillator.

As shown above, an amount of the power consumption may differ depending upon the driving frequency of the RFID oscillator in the passive RFID tag.

In an oscillator tuning system according to an exemplary embodiment of the present invention, in the above condition, since a driving threshold of the RFID tag is designed to be in a range where power is sufficient, power consumption may be reduced by making a driving frequency of the RFID oscillator lower in a range where the received energy is not abundant, i.e. a far field region, and allowing the driving frequency of the RFID oscillator to be higher in a range where received energy is abundant, i.e. a near field region, and thereby adaptively tuning the driving frequency of the RFID oscillator according to the received energy.

Figure 1:
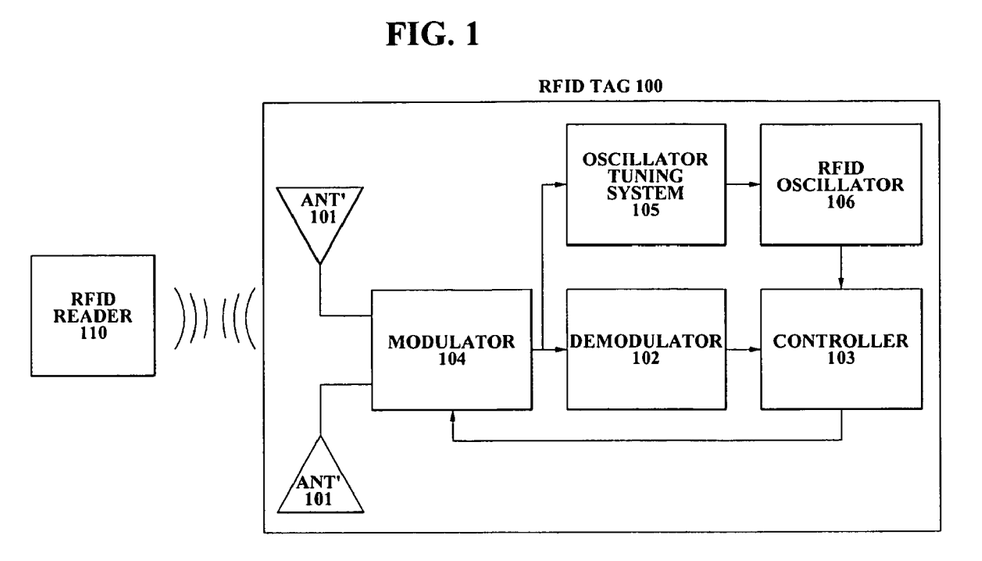
FIG. 1 is a diagram illustrating a configuration of an RFID tag according to an exemplary embodiment of the present invention.

FIG. 1 is a diagram illustrating a configuration of an RFID tag 100 according to an exemplary embodiment of the present invention. The RFID tag. 100 may include an oscillator tuning system 105 according to an exemplary embodiment of the present invention.

Referring to FIG. 1, the RFID tag 100 includes an antenna 101, a demodulator 102, a controller 103, a modulator 104, an oscillator tuning system 105, and an RFID oscillator 106.

The antenna 101 receives an RF call signal, i.e. an RF read signal, from an RFID reader 110 for reading the RFID tag 100. In this instance, the RF call signal may include identification (ID) information to call.

A power supply unit (not shown) induces a power supply voltage using the RF call signal which is received in the antenna 101, and a regulator (not shown) converts and maintains the induced power supply voltage at a certain voltage amount. Also, an amplifier (not shown) amplifies the power supply voltage maintained at the certain voltage amount to a setting value. In this instance, an amount of the amplified power supply voltage may be determined depending upon a distance between the RFID reader 110 and the RFID tag 100.

The amplified power supply voltage is supplied to various units, including the RFID oscillator 106 which is included in the RFID tag 100.

The demodulator 102 demodulates the received RF call signal into digital data. ID information from the RFID reader 110 is included in the digital data generated by the demodulation.

The RFID oscillator 106 oscillates a clock that synchronizes operation of the RFID tag 100. Particularly, the RFID oscillator 106 in this exemplary embodiment oscillates the clock while operating using a driving frequency determined through a tuning operation by the oscillator tuning system 105.

The oscillator tuning system 105 checks the generated power supply voltage, i.e. an amount of power, and adaptively tunes the driving frequency of the RFID oscillator 106 according to a comparison of the strength of the power supply voltage with a reference value. The reference value may be predetermined.

As an example, when a distance from the RFID reader 110 is small, and when the amount of the power supply voltage, used in the RFID tag 100, is abundant enough to be greater than the reference value, the oscillator tuning system 105 determines a driving condition of the RFID oscillator 106 as a near field region, and tunes the RFID oscillator 106 to operate using a driving frequency, e.g. 1.92 MHz, corresponding to the determined driving condition.

Conversely, when a distance from the RFID reader 110 is great, and when the amount of the power supply voltage which is used in the RFID tag 100 is not abundant and is less than the reference value, the oscillator tuning system 105 determines a driving condition of the RFID oscillator 106 as a far field region, and tunes the RFID oscillator 106 to operate using a driving frequency, e.g. 1.28 MHz, corresponding to the determined driving condition.

Namely, the oscillator tuning system 105 according to an exemplary embodiment of the present invention distinguishes the driving condition of the RFID tag 100 where there is abundant power, i.e. a near field region, and where there is significantly less power, i.e. a far field region, and tunes the driving frequency of the RFID oscillator 106 according to the classified conditions.

The synchronization clock generated from the RFID oscillator 106, operating using the driving frequency which is determined by the tuning, is provided to the controller 103 with the demodulated digital data.

The controller 103 extracts various information for the operation of the RFID tag 100 from a storage unit (not shown) in correspondence to the ID information and the synchronization clock in the digital data.

As an example, when ID information in the storage unit, which is matched to the ID information in the digital data, is extracted, the controller 103 generates matching ID data to provide the generated matching ID data and the extracted ID information to the modulator 104.

Conversely, when ID information in the storage unit, which is matched to the ID information in the transmitted digital data, is not extracted, the controller 103 generates unmatched ID data to provide as the extracted ID information to the modulator 104.

The modulator 104 modulates the various information, e.g. the matched ID data or the unmatched ID data, provided from the controller 103 into an RF response signal, which responds to the RF call signal. Also, the antenna 101 provides a condition for processing a subsequent signal in the RFID reader 110 by transmitting the RF response signal to the RFID reader 110.

As described above, the oscillator tuning system 105 according to an exemplary embodiment of the present invention distinguishes the driving condition of the RFID oscillator 106 according to the amount of the power supply voltage used in an RFID tag 100, and adaptively tunes the driving frequency of the RFID oscillator 106 in correspondence to the distinguished driving condition.

Figure 2:
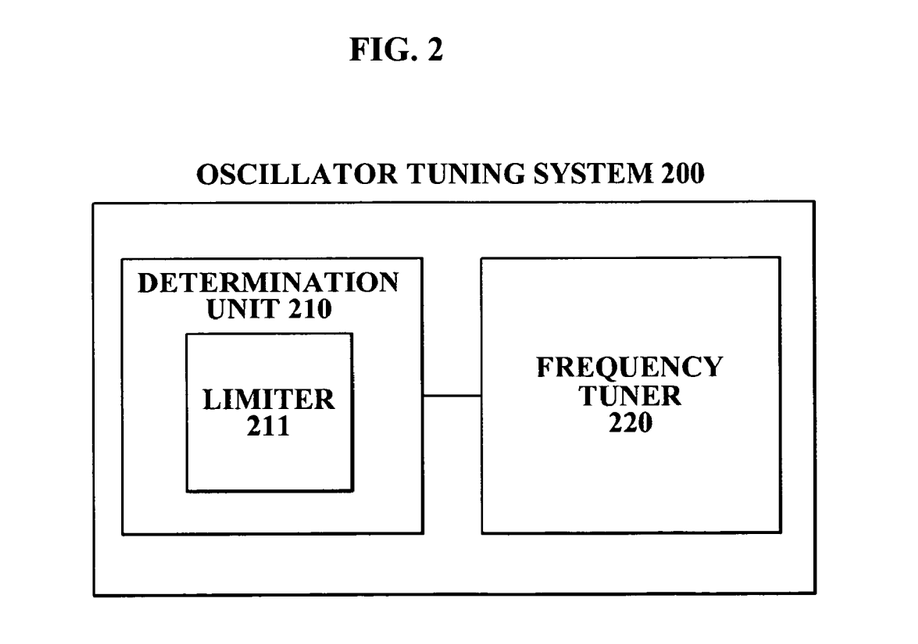
FIG. 2 is a diagram illustrating a specific configuration of an oscillator tuning system according to an exemplary embodiment of the present invention.

FIG. 2 is a diagram illustrating a specific configuration of an oscillator tuning system according to an exemplary embodiment of the present invention.

The oscillator tuning system 200 includes a determination unit 210 and a frequency tuner 220, and the determination unit 210 includes a limiter 211.

As described with reference to in FIG. 1, the oscillator tuning system 200 may be included in the RFID tag 100 of FIG. 1, and tunes a driving frequency of the RFID oscillator 106 of FIG. 1 according to an amount of a power supply voltage used in the RFID tag 100 of FIG. 1.

Referring to FIG. 2, the determination unit 210 determines how a power used in an RFID tag 100 compares to a reference value. The reference value may be adaptively established, such that subsequently a BLF of an RFID oscillator 106 may not be out of a range of a threshold due to an operator that has considered a power limit of the oscillator tuning system.

Particularly, the power used in the RFID tag 100 of FIG. 1 may be changed in correspondence to a distance between the RFID tag 100 and the RFID reader 110 of FIG. 1. Accordingly, the operator of the oscillator tuning system may establish the reference value by considering the distance limit with regard to the power limit.

The determination unit 210 determines how the amount of the power used in the RFID tag 100 of FIG. 1 or the distance between the RFID tag 100 of FIG. 1 and the RFID reader 110 compares to the reference value.

Figure 3A:
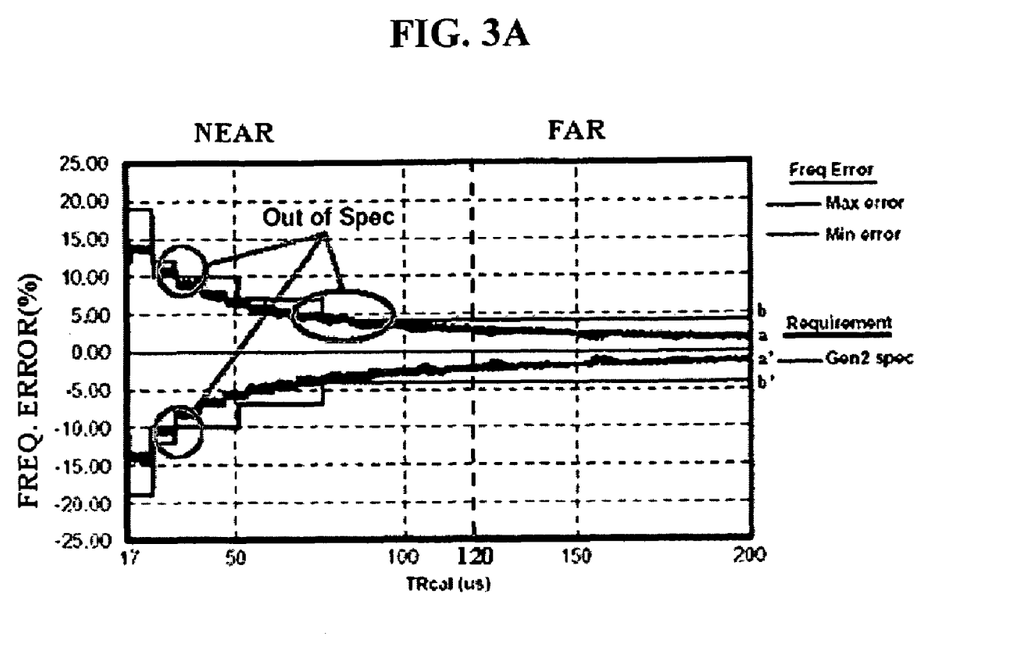
FIGS. 3A and 3B are graphs illustrating an example of establishing a reference value according to an exemplary embodiment of the present invention.
Figure 3B:
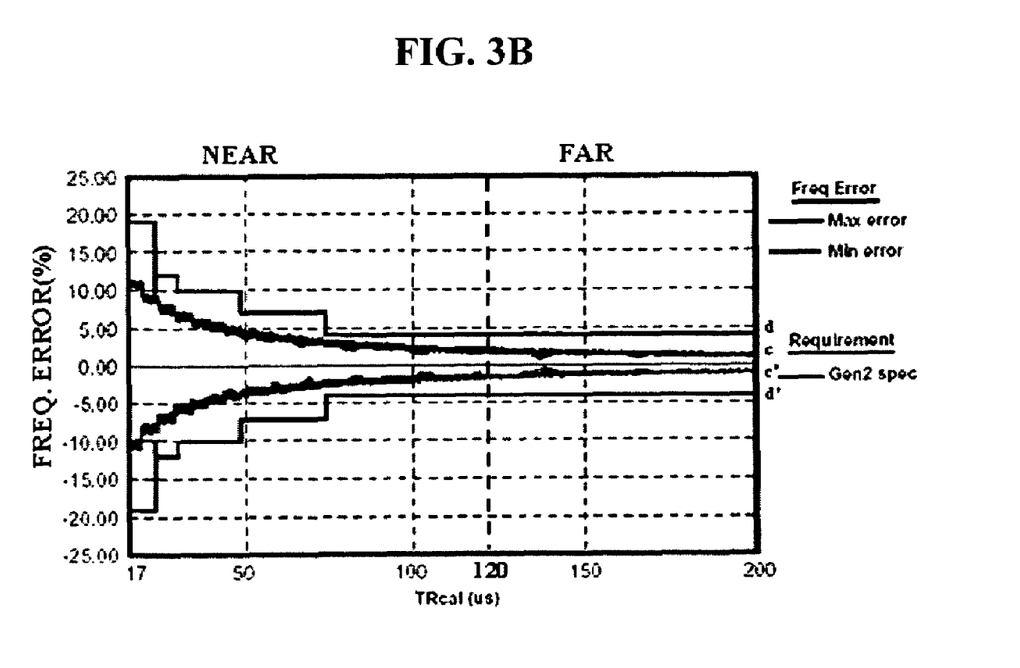

FIGS. 3A and 3B illustrate an example of establishing a reference value according to an exemplary embodiment of the present invention.

FIG. 3A illustrates a BLF distribution of the RFID oscillator 106 of FIG. 1 when operating using a frequency of 1.28 MHz, and FIG. 3B illustrates a BLF distribution of the RFID oscillator 106 of FIG. 1 when operating using a frequency of 1.92 MHz.

In FIG. 3A, the BLF distribution according to a distance of the RFID oscillator 106 of FIG. 1 which is operated using the driving frequency of 1.28 MHz is a-a', and a distribution of a range of a threshold is b-b'. As shown in FIG. 3A, when the RFID oscillator 106 of FIG. 1 is operated using the driving frequency of 1.28 MHz, a range out of the BLF distribution a-a' of the RFID oscillator 106 of FIG. 1 that is out of the range of a threshold is b-b', is in a near field region, i.e. less than 120 TRcal us in this example. Conversely, the BLF distribution a-a' of the RFID oscillator 106 of FIG. 1 that is within distribution of a range of a threshold is b-b', is in a far field, i.e. greater than 120 TRcal us in this example.

Accordingly, as shown in FIG. 3A, a driving frequency of the RFID oscillator 106 of FIG. 1 is stable in the far field region at 1.28 MHz.

In FIG. 3B, the BLF distribution according to a distance of the RFID oscillator 106 of FIG. 1 which is operated using the driving frequency of 1.92 MHz is c-c', and a distribution of a range of a threshold is d-d'. As shown in FIG. 3B, when the RFID oscillator 106 of FIG. 1 is operated using the driving frequency of 1.92 MHz, there is no range that the BLF distribution c-c' of the RFID oscillator 106 of FIG. 1 is out of the range of a threshold of d-d', and thus the operation of the RFID oscillator 106 of FIG. 1 are within a range of the threshold in all regions.

According to the oscillator tuning system according to an exemplary embodiment of the present embodiment, the reference value may be established so that the RFID oscillator 106 of FIG. 1 is operated using a comparatively higher driving frequency in the near field, i.e. where a flowed energy is abundant, and the RFID oscillator 106 of FIG. 1 is operated using a comparatively lower driving frequency in the far field region, i.e. where a flowed energy is not abundant.

Depending upon the established reference value, the determination unit 210 of FIG. 2 determines the driving condition of the RFID oscillator 106 of FIG. 1 as the near field region or the far field region as a result of the determination.

The determination unit 210 may include the limiter 211 which limits an electrical change of a variable to less than a threshold value in order to determine whether an amount of power, corresponding to a distance between the RFID tag and the RFID reader, or the distance between the RFID tag and the RFID reader satisfies the established reference value. The limiter 211 prevents a current from flowing into a circuit by preventing the variable, e.g. an amount of a voltage flowing into the circuit, from being greater than the established reference value. Hereinafter, a function of the limiter 211 which limits the variable to less than the threshold value will be referred to as 'variable maintaining function'.

The limiter 211 outputs a Low or a High as an output by considering the variable at a point which is established within the limiter.

As an example, the limiter 211 outputs the Low as the output signal while performing the variable maintaining function with respect to the variable at the point when a distance between the RFID tag 100 of FIG. 1 and the RFID reader 110 of FIG. 1 is small, and when an amount of a power, used in the RFID tag 100 of FIG. 1, is comparatively greater, i.e. a near field region, than the reference value.

Conversely, the limiter outputs the High as the output signal without performing the variable maintaining function when a distance between the RFID tag 100 of FIG. 1 and the RFID reader 110 of FIG. 1 is great, and when an amount of a power, used in the RFID tag 100 of FIG. 1, is comparatively less, i.e. a far field region.

The limiter 211 may include at least one of a resistance chain, a diode chain, and a transistor chain. The point may be established as a point between devices within the chains, and an inverter may be connected to the point to read a variable at a corresponding point.

Referring back to FIG. 2, the frequency controller 220 tunes the driving frequency of the RFID oscillator 106 of FIG. 1 according to the result of the determination of the determination unit 210.

As an example, the frequency tuner 220 tunes the driving frequency of the RFID oscillator 106 of FIG. 1 as an M multiple of 640 KHz when the limiter 211 outputs the Low, and subsequently when the determination unit 210 determines the driving condition of the RFID oscillator 106 as the near field region as the result of determination of the determination unit 210.

Also, the frequency tuner 220 tunes the driving frequency of the RFID oscillator 106 of FIG. 1 as an N multiple of 640 KHz, when the limiter 211 outputs the High, and subsequently when the determination unit 210 determines the driving condition of the RFID oscillator 106 as the far field region as the result of determination of the determination unit 210.

As an example, when the M is determined as three, the frequency tuner 220 may tune the driving frequency of the RFID oscillator 106 of FIG. 1 to be 1.92 MHz, i.e. triple that of 640 KHz. Also, when the M is determined as two, the frequency tuner 220 may tune the driving frequency of the RFID oscillator 106 of FIG. 1 in the far field region to be 1.28 MHz, i.e. twice that of 640 KHz.

Subsequently, the frequency tuner 220 tunes an oscillator current, flowing into the RFID oscillator 106 of FIG. 1, to operate the RFID oscillator 106 of FIG. 1 using the tuned driving frequency.

Consequently, the oscillator tuning system 200 of FIG. 2 according to an exemplary embodiment of the present invention enables the BLF of the RFID oscillator 106 of FIG. 1 to be within the range of the threshold by adaptively tuning a driving frequency of the RFID oscillator 106 of FIG. 1 according to the amount of the power used in the RFID tag 100 of FIG. 1.

Also, according to an exemplary embodiment of the present invention, according to the distance between the RFID tag 100 of FIG. 1 and the RFID reader 110 of FIG. 1, lower power consumption of the RFID tag 100 of FIG. 1 may be embodied in a long distance environment since a signal capable of distinguishing the far field region from the near field region is generated, and the driving frequency of the RFID oscillator 106 of FIG. 1 is tuned using the generated signal according to the distance between the RFID tag 100 of FIG. 1 and the RFID reader 110 of FIG. 1.

Figure 4:
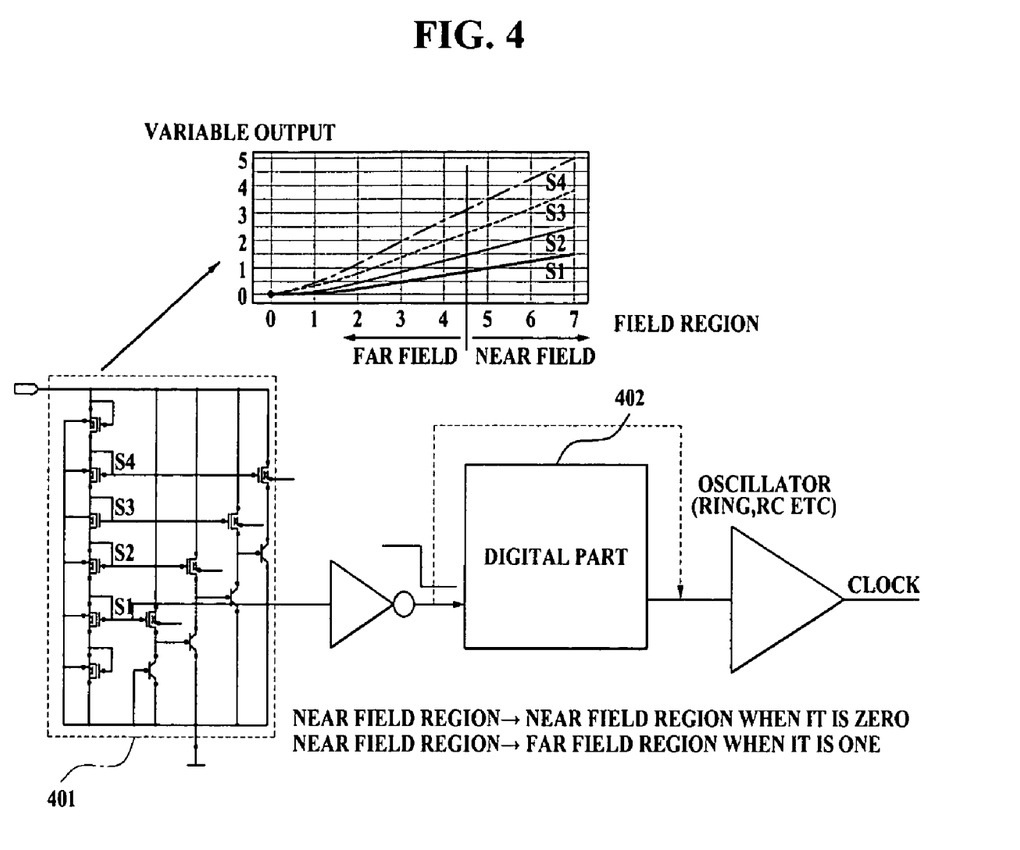
FIG. 4 is a diagram illustrating an example of operation of the oscillator tuning system according to an exemplary embodiment of the present invention.

FIG. 4 is a diagram illustrating an example of operation of the oscillator tuning system.

As illustrated in FIG. 4, a diode chain 401, limiting an electrical change of a variable to less than a threshold value, is included in the limiter 211 of FIG. 2.

The diode chain 401 operates, e.g. the diode chain 401 is charged with an electric current, when a voltage, i.e. a variable, greater than a threshold amount, is supplied to the diode. Through this, the amount of the power used in the RFID tag 100 of FIG. 1 may be derived.

As an example, where there is abundant energy, i.e. in a near field region, an amount of the voltage flowing from into the limiter 211 of FIG. 2 becomes greater than the established threshold value. Accordingly, the limiter 211 of FIG. 2 performs the variable maintaining function with respect to the amount of the voltage at a specific point. Namely, the diode chain 401 within the limiter 211 operates in the near field region, and the limiter 211 outputs a Low as an output signal.

Conversely, where there is not abundant energy, i.e. in a far field region, an amount of the voltage flowing from into the limiter 211 of FIG. 2 becomes less than the threshold value. Accordingly, the limiter 211 of FIG. 2 does not perform the variable maintaining function. Namely, the diode chain 401 within the limiter 211 of FIG. 2 does not operate in the far field region, and the limiter 211 of FIG. 2 allows the smaller amount of the voltage to flow. In this instance, the limiter 211 of FIG. 2 outputs a High as an output signal.

In FIG. 4, the output signal of the limiter 211 of FIG. 2 is output as the Low, i.e. zero, in the near field region, and the output signal of the limiter 211 of FIG. 2 is output as the High, i.e. one, in the far field region.

Examples of distinguishing the near field region from the far field region using a variable output from points S1, S2, S3 and S4 of the diode chain 401 are illustrated in FIG. 4. In this instance, the distinguishing the near field region from the far field region may vary depending on an RF front end structure.

The output signal from the limiter 211 of FIG. 2 is sent to the frequency tuner 220 of FIG. 2, i.e. a digital part 402, using a Schmitt trigger, a comparator, and an inverter.

In the digital part 402, the driving frequency of the RFID oscillator 106 of FIG. 1 may be tuned according to the near field region and the far field region by tuning an oscillator current.

Namely, the digital part 402 identifies the driving frequency of the RFID oscillator 106 of FIG. 1 as the near field region, tunes the oscillator current flowing into the RFID oscillator 106 of FIG. 1, and enables the RFID oscillator 106 of FIG. 1 to operate using a driving frequency of 1.92 MHz when the output signal High is output from the limiter 211.

Also, the digital part 402 identifies the driving frequency of the RFID oscillator 106 of FIG. 1 as the far field region, tunes the oscillator current flowing into the RFID oscillator 106 of FIG. 1, and enables the RFID oscillator 106 of FIG. 1 to operate using a driving frequency of 1.28 MHz when the output signal Low is outputted from the limiter 211.

Thus, according to an exemplary embodiment of the present invention, the BLF of the oscillator may be within a range of the threshold in all regions, and performance of the RFID tag 100 of FIG. 1 may be remarkably enhanced since the driving frequency of the RFID oscillator 106 of FIG. 1 may be adaptively tuned by distinguishing the near field region from the far field region.

Operation of the oscillator tuning system 200 of FIG. 2 according to an exemplary embodiment of the present invention is as described below.

Figure 5:
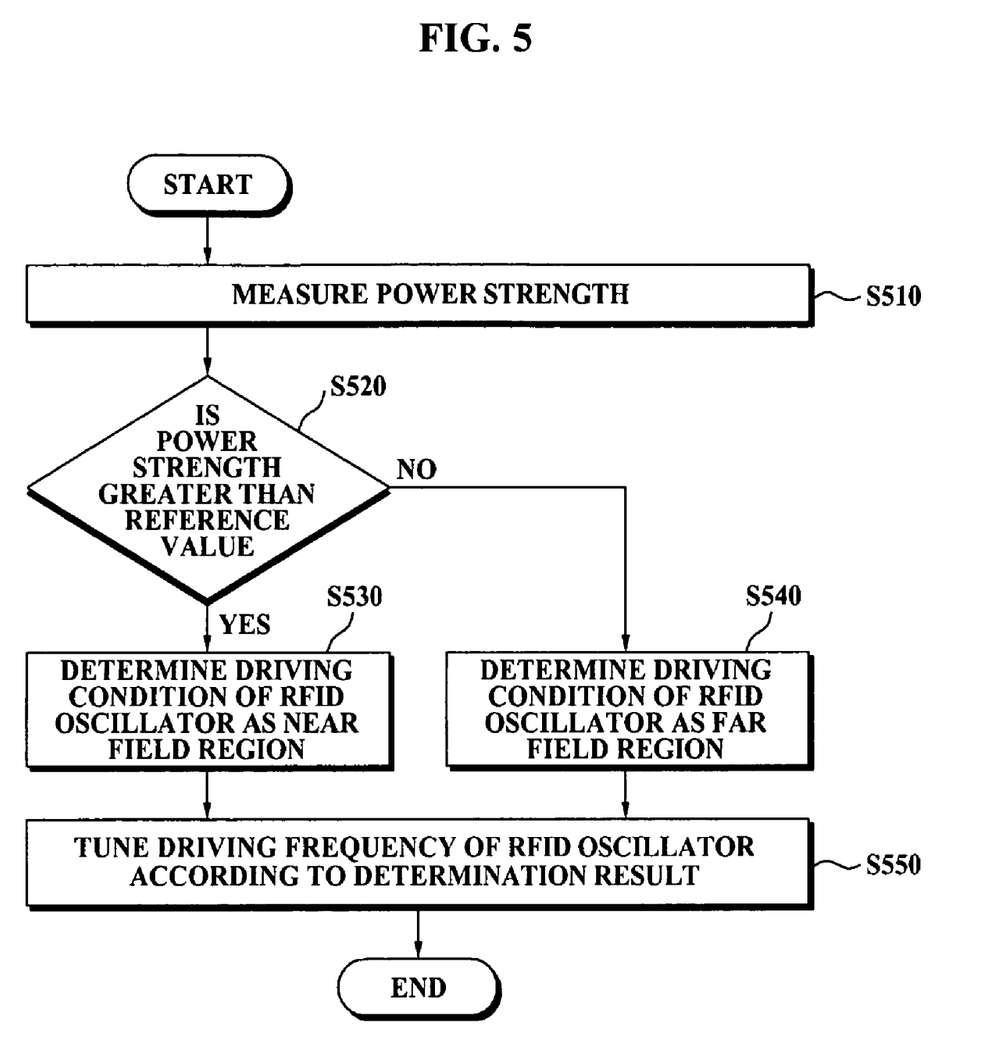
FIG. 5 is a flowchart illustrating an oscillator tuning method according to an exemplary embodiment of the present invention.

FIG. 5 is a flowchart illustrating an oscillator tuning method according to an exemplary embodiment of the present invention.

The oscillator tuning method according to an exemplary embodiment of the present invention may be performed by the oscillator tuning system 200 of FIG. 2.

In operation S510, the oscillator tuning system 200 of FIG. 2 measures an amount of a power used in the RFID tag 100 of FIG. 1 having an RFID oscillator 106 of FIG. 1. It is determined whether the measured amount of the power satisfies a reference value in operation S520, i.e. whether the measured amount of the power is greater than a reference value. In operations S510 and S520, the amount of the power used in the RFID tag 100 of FIG. 1 is measured, and the measured amount of the power is compared with the reference value in order to determine a driving condition of the RFID oscillator 106 of FIG. 1. In this instance, the reference value may be flexibly established, such that subsequently a BLF of an RFID oscillator 106 may not be out of a range of a threshold due to an operator that has considered a power limit of the oscillator tuning system 200 of FIG. 2.

Also, in operations S510 and S520, the oscillator tuning system 200 of FIG. 2 may measure a distance between the RFID tag 1 of FIG. 1, having the RFID oscillator 106 of FIG. 1, and the RFID reader 110 of FIG. 1 associated with the RFID tag 100 of FIG. 1, and determine how the measured distance compares to the reference value. As described above, the amount of the power used in the RFID tag 100 of FIG. 1 is determined depending upon the distance between the RFID tag 100 of FIG. 1 and the RFID reader 110 of FIG. 1, having the RFID oscillator 106 of FIG. 1, and the oscillator tuning system 200 of FIG. 2 may derive the amount of the power used in the RFID tag 100 of FIG. 1 by measuring the distance between the RFID tag 100 of FIG. 1 and the RFID reader 110 of FIG. 1. Namely, the oscillator tuning system 200 of FIG. 2 may determine the driving condition of the RFID oscillator 106 of FIG. 1 by determining how the distance between the RFID tag 100 of FIG. 1 and the RFID reader 110 of FIG. 1 compares to the reference value.

As the result of the determination, when the amount of the power is greater than the reference value, i.e. YES direction in operation S520, the oscillator tuning system 200 of FIG. 2 determines the driving condition of the RFID oscillator 106 of FIG. 1 as a near field region in operation S530. Specifically, in operation S530, the oscillator tuning system 200 confirms that the amount of the power is sufficient to be used in the RFID tag 100 of FIG. 1, and identifies the driving condition of the RFID oscillator 106 of FIG. 1 as the near field region, i.e. the distance between the RFID tag 100 of FIG. 1 and the RFID reader 110 of FIG. 1 is small.

On the other hand, when it is determined that the amount of the power is less than the reference value, i.e. NO direction in operation S520, the oscillator tuning system 200 of FIG. 2 determines the driving condition of the RFID oscillator 106 of FIG. 1 as a far field region in operation S540. Specifically, in operation S540, the oscillator tuning system 200 confirms that the amount of the power is not sufficient to be used in the RFID tag 100 of FIG. 1, and identifies the driving condition of the RFID oscillator 106 of FIG. 1 as the far field region, i.e. the distance between the RFID tag 100 of FIG. 1 and the RFID reader 110 of FIG. 1 is great.

In operation S520, the oscillator tuning system 200 of FIG. 2 may limit an electrical change of a variable to less than a value using the limiter 211 of FIG. 2. The performing of the variable maintaining function of the limiter 211 of FIG. 2 may be used to derive the amount of the power used in the RFID tag 100 of FIG. 1. As an example, where there is abundant energy, i.e. a near field region, an amount of the voltage flowing from into the limiter 211 of FIG. 2 becomes greater than the reference value. Accordingly, the limiter 211 performs the variable maintaining function with respect to the amount of the voltage at a specific point. Namely, the diode chain within the limiter 211 of FIG. 2 operates in the near field region, and the limiter 211 of FIG. 2 outputs a Low as an output signal.

Conversely, where there is not abundant energy, i.e. a far field region, an amount of the voltage flowing from into the limiter 211 of FIG. 2 becomes less than the reference value, and accordingly the limiter 211 of FIG. 2 does not perform the variable maintaining function. Namely, the diode chain within the limiter 211 of FIG. 2 does not operate in the far field region, and the limiter 211 of FIG. 2 allows a smaller amount of the voltage to flow. In this instance, the limiter 211 of FIG. 2 outputs a High as an output signal.

In this case, the limiter 211 of FIG. 2 may include a diode chain, a resistor chain and a transistor chain. The chain may be devices coupled in series or in parallel or both.

Also, in operation S550, the oscillator tuning system 200 of FIG. 2 tunes the driving frequency of the RFID oscillator 106 of FIG. 1 according to the result of the determination. In operation S550, the RFID oscillator 106 of FIG. 1 is tuned according to the determined driving condition.

In operation S550, the oscillator tuning system 200 of FIG. 2 tunes the driving frequency of the RFID oscillator 106 of FIG. 1 as an M multiple of 640 KHz when the driving condition is determined to be the near field region, i.e. when the limiter 211 outputs the Low.

Conversely, in operation S550, the oscillator tuning system 200 of FIG. 2 tunes the driving frequency of the RFID oscillator 106 of FIG. 1 as an N multiple of 640 KHz when the driving condition is determined to be the far field region, i.e. when the limiter 211 outputs the High. In this instance, M and N indicate positive integers, and M is greater than N.

As an example, when the M is determined as three, the oscillator tuning system 200 of FIG. 2 may tune the driving frequency of the RFID oscillator 106 of FIG. 1 to be 1.92 MHz, i.e. triple that of 640 KHz. Also, when the M is determined as two, the frequency tuner 220 may tune the driving frequency of the RFID oscillator 106 of FIG. 1 in the far field region to be 1.28 MHz, i.e. twice that of 640 KHz.

Subsequently, the oscillator tuning system 200 of FIG. 2 tunes an oscillator current, flowing into the RFID oscillator 106 of FIG. 1, to operate the RFID oscillator 106 of FIG. 1 using the tuned driving frequency.

Consequently, the oscillator tuning system 200 of FIG. 2 according to an exemplary embodiment of the present invention enables the BLF of the RFID oscillator 106 of FIG. 1 to be within the range of the threshold by adaptively tuning a driving frequency of the RFID oscillator 106 of FIG. 1 according to the amount of the power used in the RFID tag 100 of FIG. 1.

Also, according to an exemplary embodiment of the present invention, considering the distance between the RFID tag 100 of FIG. 1 and the RFID reader 110 of FIG. 1, lower power consumption of the RFID tag 100 of FIG. 1 may be embodied in a long distance environment since a signal capable of distinguishing the far field region from the near field region is generated, and the driving frequency of the RFID oscillator 106 of FIG. 1 is tuned using the generated signal.

According to exemplary embodiments of the present invention, a BLF of an RFID oscillator may be within a range of a threshold in all regions since a driving frequency of the RFID oscillator is adaptively tuned depending upon a strength of a power used in an RFID tag.

Also, according to exemplary embodiments of the present invention, there is provided an oscillator tuning system and an oscillator tuning method which can process a signal of an RFID tag using lower power consumption in a long distance environment since a signal capable of being used to distinguish a far field region from a near field region is generated according to a distance between the RFID tag and an RFID reader, and a driving frequency of an RFID oscillator is tuned using the generated signal.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An oscillator tuning system comprising:
   a determination unit which determines whether a power which is used in an RFID tag having an RFID oscillator is greater than a reference value; and
   a frequency tuner which tunes a driving frequency of the RFID oscillator according to a result of the determination,
   wherein the determination unit determines a driving condition of the RFID oscillator as a near field region or a far field region as the result of the determination.

2. An oscillator tuning system comprising:
   a determination unit which measures a distance from an RFID tag having an RFID oscillator to an RFID reader associated with the RFID tag, and determines whether the measured distance is greater than a reference value; and
   a frequency tuner which tunes a driving frequency of the RFID oscillator according to a result of the determination,
   wherein the determination unit determines a driving condition of the RFID oscillator as a near field region or a far field region as the result of the determination.

3. The oscillator tuning system of claim 1, wherein the frequency tuner
   tunes the driving frequency of the RFID oscillator as an M multiple of 640 KHz if the driving condition is determined as the near field region, and
   tunes the driving frequency of the RFID oscillator as an N multiple of 640 KHz, N being greater than M, if the driving condition is determined as the far field region.

4. The oscillator tuning system of claim 1, wherein the determination unit comprises a limiter which limits an electrical change of a variable to be less than a reference value, and the limiter outputs a Low or a High as an output by considering the variable at an established point within the limiter.

5. The oscillator tuning system of claim 4, wherein the limiter comprises at least one of a resistor chain, a diode chain, and a transistor chain.

6. The oscillator tuning system of claim 4, wherein, if the Low is output from the limiter, the determination unit determines the driving condition of the RFID oscillator as the near field region as the result of the determination, and the frequency tuner tunes the driving frequency of the RFID oscillator as an M multiple of 640 KHz.

7. The oscillator tuning system of claim 4, wherein, if the High is output from the limiter, the determination unit determines the driving condition of the RFID oscillator as the far field region as the result of the determination, and the frequency tuner tunes the driving frequency of the RFID oscillator as an N multiple of 640 KHz.

8. The oscillator tuning system of claim 1, wherein the frequency tuner tunes the driving frequency of the RFID oscillator by tuning an oscillator current flowing into the RFID oscillator.

9. An oscillator tuning method comprising:

determining whether a power which is used in an RFID tag having an RFID oscillator is greater than a reference value; and tuning a driving frequency of the RFID oscillator according to a result of the determination, wherein the determining of whether the power which is used in the RFID tag having the RFID oscillator is greater than the reference value comprises:

determining a driving condition of the RFID oscillator as a near field region or a far field region as the result of the determination.

10. An oscillator tuning method comprising:

measuring a distance from an RFID tag having an RFID oscillator to an RFID reader associated with the RFID tag;

determining whether the measured distance is greater than a reference value; and tuning a driving frequency of the RFID oscillator according to a result of the determination, wherein the determining of whether the measured distance is greater than the reference value comprises:

determining a driving condition of the RFID oscillator as a near field region or a far field region as the result of the determination.

11. The oscillator tuning method of claim 9, wherein the tuning of the driving frequency of the RFID oscillator according to the result of the determination comprises:

tuning the driving frequency of the RFID oscillator as an M multiple of 640 KHz if the driving condition is determined as the near field region, and tuning the driving frequency of the RFID oscillator as an N multiple of 640 KHz, N is being greater than M, if the driving condition is determined as the far field region.

12. The oscillator tuning method of claim 9, wherein the determining of whether the power which is used in the RFID tag having the RFID oscillator is greater than the reference value comprises:

limiting an electrical change of a variable to be less than a reference value; and outputting a Low or a High as an output by considering the variable at an established point.

13. The oscillator tuning method of claim 12, wherein the limiter comprises at least one of a resistor chain, a diode chain, and a transistor chain.

14. The oscillator tuning method of claim 12, wherein, if the Low is output, the determining of whether the power which is used in the RFID tag having the RFID oscillator is greater than the reference value further comprises determining the driving condition of the RFID oscillator as the near field region as the result of the determination, and the tuning of the driving frequency tunes the driving frequency of the RFID oscillator the as an M multiple of 640 KHz.

15. The oscillator tuning method of claim 12, wherein, if the High is output, the determining of whether the power which is used in the RFID tag having the RFID oscillator is greater than the reference value further comprises determining the driving condition of the RFID oscillator as the far field region, as the result of the determination, and the tuning of the driving frequency tunes the driving frequency of the RFID oscillator the as an N multiple of 640 KHz.

16. The oscillator tuning method of claim 9, wherein the tuning of the driving frequency tunes the driving frequency of the RFID oscillator by tuning an oscillator current flowing into the RFID oscillator.

17. The oscillator tuning system of claim 1, wherein the determination unit and the frequency tuner are provided on the RFID tag.

* * * * *